July 25, 1967 — E. E. FAUSER — 3,332,593
CAMERA SUPPORT
Filed May 31, 1966 — 2 Sheets-Sheet 1
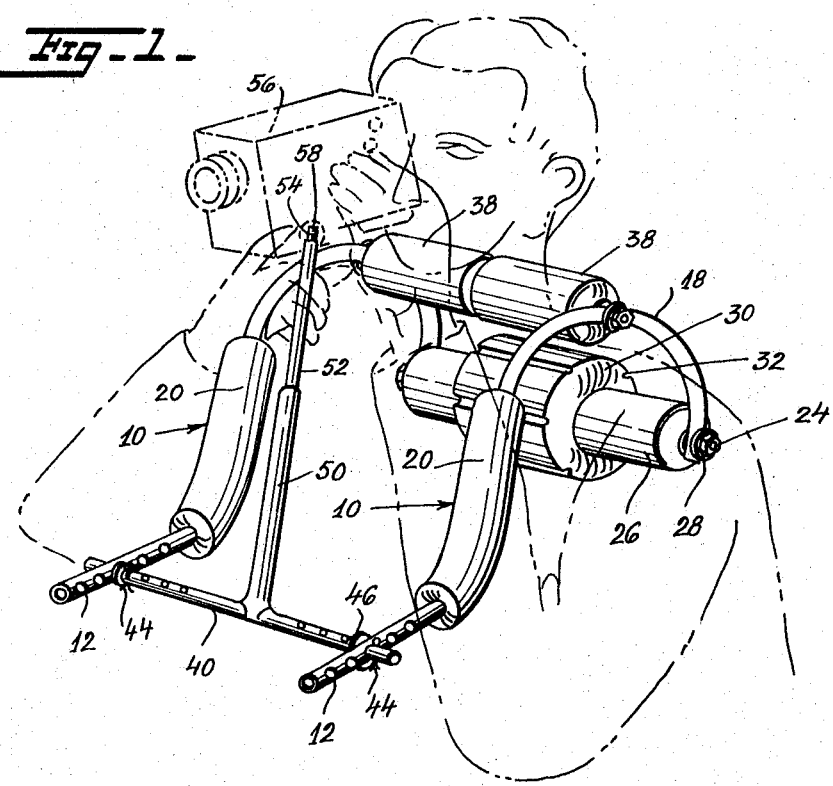
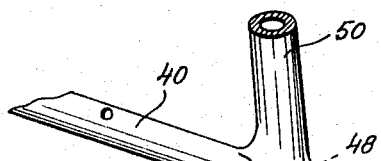
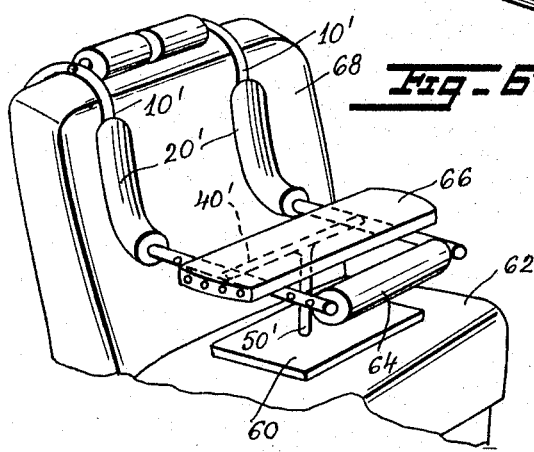
INVENTOR.
Elmer E. Fauser
BY
Polachek & Saulsbury
ATTORNEYS

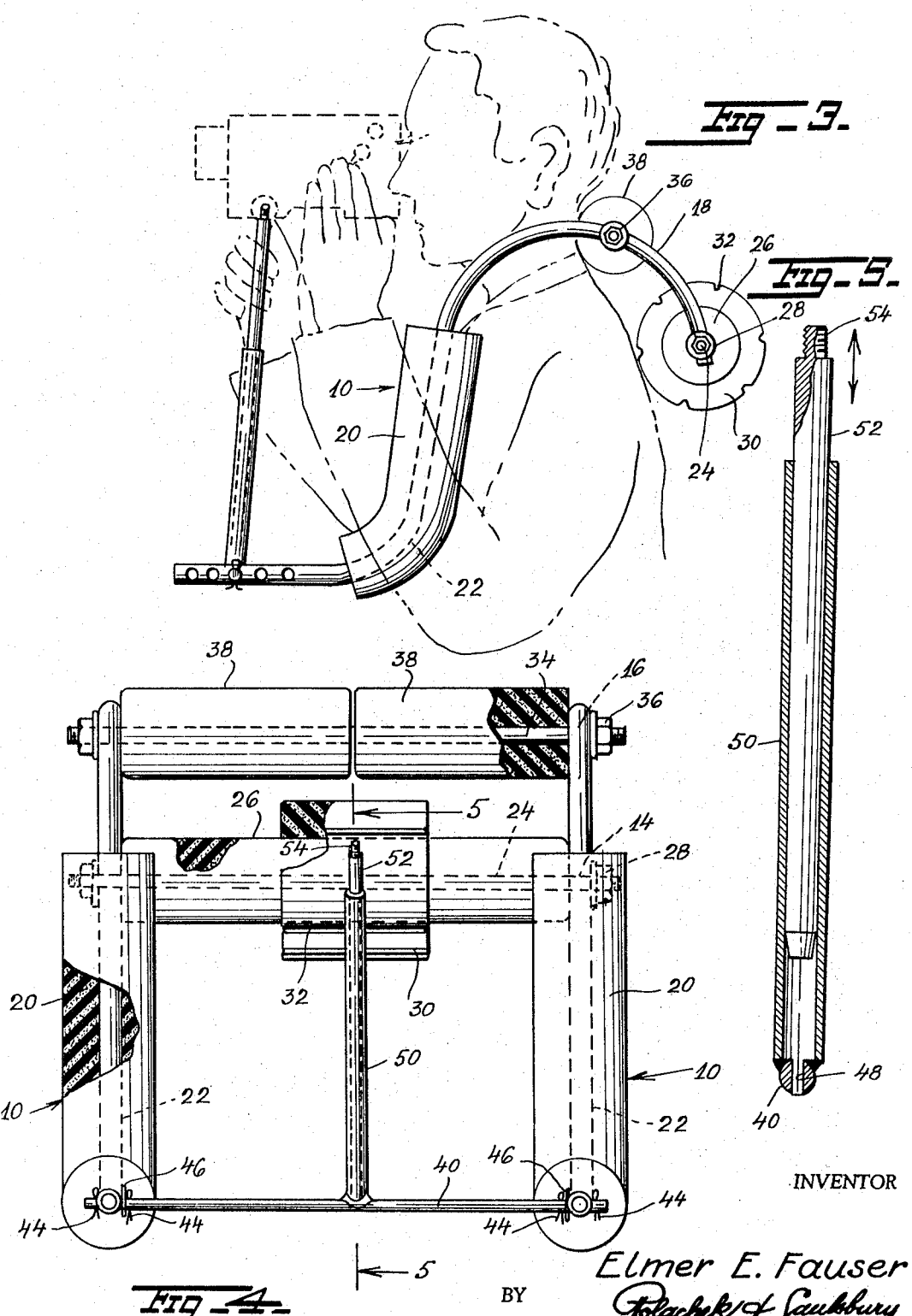

United States Patent Office 3,332,593
Patented July 25, 1967

3,332,593
CAMERA SUPPORT
Elmer E. Fauser, 2207 W. Laura Ave.,
West Peoria, Ill. 61614
Filed May 31, 1966, Ser. No. 554,070
8 Claims. (Cl. 224—5)

ABSTRACT OF THE DISCLOSURE

A camera support having a pair of elongated curved spaced body-engaging tubular members, a body-engaging roller unit spanning the space between the members at one end thereof, a rod spanning the space between the other end thereof, another body-engaging roller unit spanning the space between the members intermediate the ends thereof, and means on the rod for adjustably supporting a camera.

This invention relates generally to camera supports and more particularly to a support for supporting the camera on the body of the photographer independently of holding the camera with the hands.

The improved support is especially useful in small cameras for taking motion pictures although it may be useful with cameras for taking still pictures and with binoculars or the like. The small camera referred to is a camera for personal use which is usually carried about by people interested in taking motion pictures.

In the taking of motion pictures, the camera is usually held at eye level so that the user may sight through the finder or other mechanism thereon, and the camera should be held quite steadily and solidly. Cameras ofttimes used at different spectacles and events and sometimes after the user has placed himself in the desired position there may be considerable lapse of time before conditions are just right for taking of the pictures. This ofttimes becomes tiresome in holding the camera in the elevated position of the line of sight or thereabouts.

Furthermore, the resultant fatigue tends to make the user hold the camera less steady. An important object of the present invention therefore, is to provide a camera support which may be quickly and easily engaged on the body of the user for holding the camera in a correct or approximately correct position, thus freeing the hands of the user and supporting the camera in a stable manner.

Another object of the invention is to provide a camera accessory useful in steadying the camera and utilizing a tripod to relieve the user's arm from bearing the full weight of the camera.

Another object is to provide a tripod support for a camera with a head rest.

Still another object is to provide a tripod camera support that is adapted to be readily stored on the back of an automobile seat for instant use.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of the improved camera support in use shown supported and carried by the body of the user.

FIG. 2 is a fragmentary perspective view of the joint between the rod and one of the curved tubular members.

FIG. 3 is a side elevational view of the parts shown in FIG. 1.

FIG. 4 is a front elevational view of the camera support, parts being shown broken away.

FIG. 5 is a vertical sectional view taken on the line 5—5 of FIG. 4, and

FIG. 6 is a perspective view of a modified form of the invention.

Referring now in detail to the various views of the drawings, the camera support comprises a pair of spaced substantially S-curved or compound curved elongated tubular members 10, 10 formed with a series of spaced transverse holes 12 at one end thereof. A single transverse hole 14 is formed in the extremity of the other end of each curved tubular member, and a similar hole 16 is formed in each curved tubular member remote from the hole 14 in the adjacent curved portion or elbow 18 of the curved tubular member. A foam plastic sleeve 20 embraces the curved portion or elbow 22 of each curved tubular member adjacent the perforated end thereof. One end of sleeve 20 is curved to conform to the curvature of the curved portion or elbow 20, said latter curved portion or elbow merging gracefully with the remainder of the curved tubular member. A roller unit is disposed between the other ends of the curved tubular members 10, 10 including a round metal shaft 24 extending through the holes 14 in the perforated ends of the curved tubular members. A cylindrical roller 26 of foam plastic is sleeved around the shaft 24, its ends engaging the extremities of the curved tubular members 10, 10. The extending ends of the shaft 24 are screw-threaded and the shaft is fastened in position by nuts 28 on the ends thereof. A shorter and thicker cylindrical member 30 of similar material is sleeved around the roller 26 and fastened thereto in any suitable manner midway the ends thereof. The member 30 is formed with elongated grooves 32 extending from end to end of the outer surface thereof.

A roller unit is also positioned between the curved portions or elbows 18 of the curved tubular members 10, 10. The unit consists of a round metal shaft 34 extending across the space therebetween and through the holes 16 in the curved tubular members 10, 10, the outer ends of the shaft 34 being threaded to receive nuts 36 for holding the shaft in position. A pair of foam plastic rollers 38 is sleeved around the shaft 34, the outer ends thereof abutting the curved portions or elbows 18 of the curved tubular members 10, 10 the inner ends being in abutment with each other. The rollers 38 are spaced inwardly from the roller 26.

An elongated round rod 40 extends across the space between the perforated ends of the curved tubular members 10, 10 and is formed with a series of closely spaced holes 42 therethrough adjacent the ends thereof. The ends of the rod extend through the holes 12 in the perforated ends of the curved tubular members 10, 10 and are removably secured by cotter pins 44 extending through the holes 42 in the rod 40 on both sides of the tubular members 10, 10. Washers 46 are preferably interposed between the inner cotter pins and the surfaces of the curved tubular members. Midway, the ends of rod 40, a hole 48 is formed thereacross. A metal tubular member 50 has one end welded to the rod 40 around the upper end of the hole 48, the lower end of the hole being exposed to the atmosphere. The tubular member 50 extends radially of the rod and is open at the outer end thereof to receive slidably and telescopically a solid stem 52 formed with a reduced threaded outer end 54.

In use, a conventional camera such as the box-like camera 56 shown in FIG. 1 having an internally screw threaded socket 58 in its base is supported on the stem 52 by threading the socket 58 onto the threaded end 54 of the stem 52, with the lens 60 of the camera positioned outwardly thereof as shown in FIG. 1. The curved tubular members 10, 10 are placed over the head and on the shoulders of the photographer with the cylindrical roller 30 positioned on the back between the shoulders and the pair of rollers at the back of the neck and with the sleeve 20, 20 on the chest of the photographer.

In order to adjust the camera support on the body of the photographer, it is merely necessary to move the rod 40 inwardly or outwardly along the perforated ends of the curved tubular members 10, 10 and hold it in adjusted position by the cotter pins 44.

In order to adjust the camera 56 so as to obtain proper registry of the eye piece of the view finder with the eye of the photographer, its merely necessary to adjust longitudinally the stem 52 by sliding it up and down in the tubular member 50 against the pressure of the air in the member 50, the position of the camera relative to the eye being adjusted readily by the hands of the photographer, one of which is placed at the front of the camera and the other at the back as seen in FIG. 1.

Referring now to the modification of the invention shown in FIG. 6, the support shown herein is similar to the support shown in FIG. 1, but differs in that the tubular member 50' extends radially downwardly of the rod 40' instead of upwardly. A rectangular plate 60 is carried on the seat 62 of the automobile. A roller 64 is supported between the extreme ends of the curved tubular members 10', 10'. A cushion pad 66 is shown supported across the horizontal portions of the curved tubular members 10', 10'. The curved tubular members 10', 10' are shown supported on the back support 68 of the automobile seat.

In using this modified form of support, on the seat of an automobile, a child can be supported in a sitting position on the cushion pad 66 with his back against the back support 68 of the seat, between the sleeves 20', 20', and with his legs dangling down over the roller 64. The pad is raised above the seat of the automobile by means of the depending tubular member 50'.

An adult seated on the automobile seat can also use the support shown in FIG. 6 by sitting on the seat and plate 60 with the cushion pad 66 on his lap. When thus seated, the arms of the adult may be supported on the projecting ends of the cushion pad 66 taking the strain off of the driving chore.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. A camera support comprising a pair of elongated curved spaced body-engaging tubular members, a body-engaging roller unit spanning the space between the members at one end thereof, a rod spanning the space between the other end thereof, another body-engaging roller unit spanning the space between the members intermediate the ends thereof, means on the rod for adjustably supporting a camera, said body-engaging roller unit at one end of the tubular members including a shaft disposed between the extremities of the tubular members at said one end, a cylindrical foam plastic roller sleeved around the shaft extending the length of the space, and another cylindrical foam plastic roller sleeved around the roller around the shaft, midway the ends thereof, said other roller being thicker than the roller around the shaft and having grooves on its outer surface extending the length thereof.

2. A camera support comprising a pair of elongated curved spaced body-engaging tubular members, a body-engaging roller unit spanning the space between the members at one end thereof, a rod spanning the space between the other end thereof, another body-engaging roller unit spanning the space between the members intermediate the ends thereof, means on the rod for adjustably supporting a camera, the body-engaging roller unit intermediate the ends of the curved tubular members including a shaft spanning the space between the curved tubular member, and a pair of foam plastic roller sleeves around the shaft in side by side abutting relation.

3. A camera support comprising a pair of elongated curved spaced body-engaging tubular members, a body-engaging roller unit spanning the space between the members at one end thereof, a rod spanning the space between the other end thereof, another body-engaging roller unit spanning the space between the members intermediate the ends thereof, means on the rod for adjustably supporting a camera, the end of each curved tubular member being formed with spaced holes thereacross and therealong, the rod being formed with spaced holes thereacross at both ends thereof and with a hole thereacross midway its ends, the ends of the rod extending through the holes in the curved tubular members, cotter pins extending through the holes in the rod on both sides of the curved tubular members for securing said ends in position, the means on the rod for adjustably supporting a camera including a tubular member fastened at one end to the rod over the hole midway the ends thereof, said latter tubular member being open at its other end, a stem slidably and telescopically slidable in the top end of said latter tubular member against the pressure of air passing through the hole midway the ends of the rod, said stem having an outer reduced externally threaded end adapted to coact with a threaded socket in a camera structure.

4. A camera support as defined in claim 3 wherein the body-engaging roller unit at one end of the tubular members includes a shaft disposed between the extremities of the tubular members at said one end, a cylindrical roller of foam plastic sleeved around the shaft extending the length of the space, and another cylindrical roller of foam plastic sleeved around the roller around the shaft, midway the ends thereof, said other roller being thicker than the roller around the shaft and having grooves on its outer surface extending the length thereof.

5. A camera support as defined in claim 3 wherein the body-engaging roller unit intermediate the ends of the curved tubular members includes a shaft spanning the space between the curved tubular members, and a pair of foam plastic rollers sleeved around the shaft in side by side abutting relation.

6. A camera support as defined in claim 3 wherein foam plastic sleeves are sleeved around the curved tubular members along a curved portion thereof closely spaced from the other end thereof.

7. A camera support as defined in claim 3 wherein the body-engaging roller unit intermediate the ends of the curved tubular members includes a shaft spanning the space between the curved tubular members, and a pair of foam plastic rollers sleeved around the shaft in side by side abutting relation and wherein the body-engaging roller unit at the end of the tubular members includes a shaft disposed between the extremities of the tubular members at said one end, a cylindrical roller of foam plastic sleeved around the shaft extending the length of the space, and another cylindrical roller of foam plastic sleeved around the roller around the shaft, midway the ends thereof, said other roller being thicker than the roller around the shaft and having grooves on its outer surface extending the length thereof.

8. A camera support comprising a pair of elongated curved spaced body-engaging tubular members, a body-engaging roller unit spanning the space between the members at one end thereof, a rod spanning the space between the other end thereof, another body-engaging roller unit spanning the space between the members intermediate the ends thereof, means on the rod for adjustably supporting a camera, a tubular member depending from the rod, a plate carried at the bottom end of said tubular member, and a cushioning pad across the pair of elongated curved spaced body-engaging tubular members.

References Cited

UNITED STATES PATENTS

| | | |
|---|---|---|
| 1,130,689 | 3/1915 | Atkinson. |
| 2,636,822 | 4/1953 | Anderson _____ 95—86 |
| 2,746,369 | 5/1956 | Beard et al. _____ 95—86 |
| 2,771,826 | 11/1956 | Shapiro _____ 224—5 X |

FOREIGN PATENTS

| | | |
|---|---|---|
| 380,036 | 4/1940 | Italy. |

HUGO O. SCHULZ, *Primary Examiner.*